INVENTORS
HAROLD D. BECHTOL
ROBERT J. CLARK
BY
ATTORNEY

FIG. 8b

United States Patent Office 3,266,174
Patented August 16, 1966

3,266,174
TRAINING APPARATUS
Harold D. Bechtol and Robert J. Clark, Binghampton,
N.Y., assignors to General Precision, Inc., Binghamton,
N.Y., a corporation of Delaware
Filed Sept. 22, 1964, Ser. No. 398,218
11 Claims. (Cl. 35—11)

This invention relates to a training apparatus, and more particularly, to an improved training apparatus for testing and training one or more operators of vehicles, and for monitoring and recording the results of such training.

For the obvious reason that the operation of vehicles upon public highways or in the air is inherently dangerous, the advantages of providing a grounded vehicle training apparatus for initially training and testing inexperienced operators prior to the operators' undertaking the control of an actual vehicle, as well as for the retraining and re-testing of experienced operators, are readily apparent.

Therefore, according to the prior art, there have been provided a large number of such simulated training devices. In general, a large majority of the prior art devices include one or more operator stations furnished with dummy controls and indicating devices which simulate the controls and indicating devices of an actual vehicle. Realistic problems are presented to student operators at the stations by means of a motion picture projector which projects scenes on a projection screen positioned forward of the operators' positions, and sometimes also on screens at the rear, to provide traffic problems involving forward and/or reverse operation of the vehicle being simulated. The skill and reaction time of the operators in response to the various problems presented upon the screens then may be monitored, indicated, and/or recorded.

Normally, it is desirable that the reactions of all of the operator-trainees be conveyed to, and monitored, indicated, and/or recorded, at a central station, the instructor's station. The central station usually is situated together with the motion picture projector, indicating lights, and a recorder, and at this control station an instructor can individually monitor each student reaction to a specific problem.

Such installations become relatively complex when a large number of operator positions are required because of the enormous number of interconnecting cables necessary to couple each student-operator station to the central instructor's station. One arrangement which provides all of the above listed features, yet significantly reduces the number of interconnection cables necessary, is shown and described in copending application Serial No. 337,096, filed January 10, 1964, on behalf of Gene H. Sheridan and assigned to the assignee of the present invention, which application is a continuation of Serial No. 180,428, filed March 19, 1962. An improved version of such an apparatus which requires only a single conductor cable from each operator's location back to the instructor's station is shown and described in U.S. Patent No. 3,186,-110.

In the above-mentioned prior art, a signal generated either manually or in response to digital data encoded on the film and indicative of the problem about to be presented to each student, is fed from the instructor's station to each student-operator station. At each student station the signal is employed to monitor the student's operation of those controls necessary to correctly solve the problem. The result of the student's reactions to a given problem is then returned to the instructor's station, where it may be indicated and/or recorded. Additionally, system flexibility is provided for in the present invention by provision of means which give the instructor an opportunity to use either automatic or manual performance testing modes, according to the needs of the situation (student ability, proficiency goals, etc.). The instructor, therefore, has the opportunity to adapt to local conditions and also to changing conditions in the classroom. An automatic *error checking* mode is generally most efficient after students have acquired some proficiency in operating the simulated vehicle, however. There are times when the instructor can do his most effective teaching job by use of the manual operation, and by making certain checks which he himself arranges according to the local traffic situation surrounding a particular locale. The manual mode of *error checking* operation is particularly effective in learning situations which require a specific response to a specific set of circumstances in that it enables the instructor to concentrate on the response required.

In respect now to performance recording and scoring, it generally was regarded prior to the above-mentioned Sheridan invention that it was necessary to record all student responses, correct as well as incorrect, as a prerequisite to meaningful scoring because it enabled the evaluator to consider not only error, but a measure of the degree of error as well. That theory may be true for a training apparatus which does not incorporate automatic, instantaneous student error feedback, because committed errors, going uncorrected, will naturally show a rather wide spread in the course of any given program of instruction. However, when immediate student and instructor error feedback is used, coupled with program repetition, the errors committed tend to diminish rapidly as the program progresses, and those that do occur will be very close to the correct response, so that factors such as "degree of error" no longer have appreciable meaning. This is part of the extremely important and novel reasoning behind this invention. In the present invention, as in the above-referenced inventions, monitoring, indicating, and/or recording is performed only in response to student *error*, as distinguished from a correct response, thus greatly simplifying the instructor's task of testing and scoring large numbers of students on a comparative basis.

According to the present invention, there is provided an improved training apparatus which operates to monitor, indicate and/or record only *student errors* for the reasons discussed above, rather than recording the actual operation of the simulated control, and, further, operates to monitor, indicate, and/or record these errors in an extremely flexible and highly efficient manner. Although the apparatus of the invention is adaptable for use with any vehicle being simulated, for ease and clarity in explaining the principles of the invention only, it will be applied specifically to an automobile trainer, it being understood by those skilled in the art that the apparatus may be readily extended to other and different simulated vehicles. In an automobile driver trainer, a large number of controls and indicating devices are simulated, such as speed, steering, lights, brakes, clutch, etc. by way of example, and, further, both the incorrect operation, as well as the degree of the incorrect operation, are normally monitored, indicated, and/or recorded. For the reason that most installations include a single central station and 12, 20, or more student locations, it should be readily apparent that a large number of interconnecting wires and cables between each student location and the central location may be required. Although the inventions described and claimed in copending applications Serial Nos. 337,096 and 268,074 afford a marked reduction as compared to the prior art in the number of necessary interconnection wires, each still requires a multichannel recorder for each one of the student locations. The present invention, however, while also affording a marked reduction in the number of necessary interconnection wires, requires only a single recording channel for each student location, independently of the number of different types of tests being presented during each film sequence. Additionally, and this is an important feature of the invention, each individual test problem is positively identified on a printed score-sheet, together with the identification of the specific student locations at which the particular control was incorrectly operated in response to the test problem, together wtih a total count of the number and types of errors performed at each location, all as more particularly hereinafter described.

One object of the invention is to provide an improved training apparatus for testing and training one or more operators of vehicles, and for monitoring, indicating, and recording the results of such training.

Still another object of the invention is to provide a training apparatus including a simplified yet extremely flexible recording device.

A further object of the invention is to provide an improved training apparatus for monitoring, indicating, and/or recording only the errors performed by the student-trainees in response to projected stimuli.

Yet another object of the invention is to provide an improved training apparatus which, while affording a marked reduction in the number of interconnection cables between a central, or instructor's station and a number of student locations, requires only a single recording channel for each of the student locations.

A still further object of the invention is to provide an improved automobile drive trainer which operates to monitor, indicate, and/or record all errors performed by a number of student-trainees in an extemely flexible and highly efficient manner.

The invention accordingly comprises the features of construction, combinations of elements, and arrangement of parts, which will be exemplified in the constructions hereinafter set forth, and the scope of the invention will be indicated in the claims.

For a fuller understanding of the nature and objects of the invention reference should be had to the following detailed description taken in conjunction with accompanying drawings in which.

In the detailed description to follow, it should be understood that a preferred embodiment of the invention is illustrated as including one or more operator-trainee positions each equipped with a number of simulated control and indicating devices for operation by the student. Further, a projector is provided to display upon a screen, a sequence of scenes to present to the trainees a series of problems or tests. The incorrect reaction of the trainee to a test is determined by monitoring, indicating, and/or recording the trainee's operation or nonoperation of a given simulated control, in accordance with the specific problem presented. The present invention may be utilized with a more complicated television projection system, such as those systems which include television camera moved with respect to a small-scale simulated highway scene in response to the trainee's operation of his simulated controls.

Figure 1:
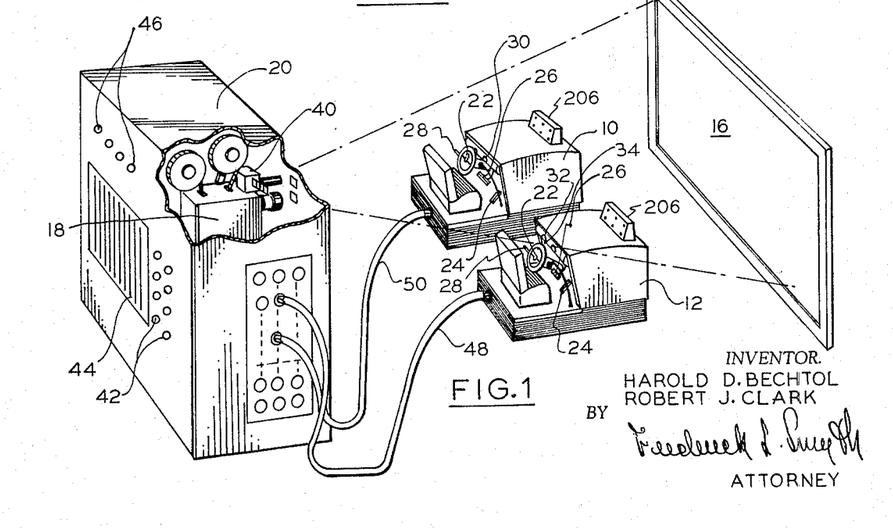
FIG. 1 is a pictorial view illustrating the general arrangement of a preferred embodiment of the training apparatus of the invention.

In FIG. 1 the general arrangement of one embodiment of the invention is shown. The apparatus includes one or more student-trainee stations, generally indicated at 10 and 12, it being understood that only one, or a greater number of such positions, may be employed as desired, and, for economy, a number of positions, such as twenty, are generally provided in a single installation. A screen 16 is located forward of all the trainee positions to display problems and tests during the simulated forward motion of each trainee's vehicle. Additionally if desired, a further screen (not shown) may be located behind all of the trainee positions to display problems and tests during the simulated rearward motion of each trainee's vehicle in accordance with the teachings of U.S. Patent No. 3,205,-592. Scenes are displayed on screen 16 by means of a projector 18 housed in an upper portion of an instructor's station 20. Also if desired, an auxiliary manual slide projector 40 may be installed at the instructor's station.

A brief summary of the operation of certain prior art driver training apparatus will next be described as an aid in understanding a preferred embodiment of the present invention.

The known form of apparatus includes a unique D.C. analog simulation of an automobile engine-transmission-speedometer system using RC circuits without operational amplifiers. A motion picture projector presents a program and sequence of trip scenes to the students, and in synchronism therewith digital data encoded on the film sound track operates monitoring equipment to check whether the various student operating controls are properly positioned at various instants, and student errors are both indicated and recorded. In one embodiment described therein, serial 5-bit digital pulse trains are recorded on the film sound track, which are thereafter converted into electrical signals and fed to a shift register which temporarily stores the digital number in parallel binary form. Next, the binary number is decoded in a diode matrix, which selectively energizes a predetermined one of a number of parallel conductors coupling each of the student's locations to the central station, the energized one of the conductors being associated with a given simulated control condition to be monitored. In the specific embodiment shown therein, nineteen different and separate operating conditions of the simulated automobile are sensed to determine whether or not the student's control operation is correct in response to the stimuli displayed, and hence up to nineteen different binary numbers are encoded on the films to be used with the apparatus, for the purpose of indicating which operating condition is to be checked. Since the binary decoding matrix employed, (which may be of the class described in Arithmetic Operations in Digital Computers by R. K. Richards, published in 1955 by D. Van Nostrand Company, Inc., at pages 71 et seq.), allows up to 32 tests to be made, more or less than 19 tests may be utilized when a given binary number is encoded on the film and used by the apparatus, and a selected output wire of the matrix is energized in response thereto. By way of example, the binary number "five" may be encoded on the film during and prior the time interval a scene or displayed sequence demands that the student steer full to the right. Upon decoding this binary number, the matrix energizes the number "five" output conductor, thereby directing an output voltage to an error-indicating device associated with a selected one of all the similar controls positioned at the student locations. However, should the student be steering full to the right at the time the number "five" output conductor is energized, a switch electrically connected in series with the number "five" conductor is opened, thereby preventing the further energization of both the error-indicating and error-recording devices. Alternatively, if the student is steering in any other direction during this time interval, the switch will remain closed, and the error indicating and/or recording device is activated. Complete details of this briefly described training apparatus, of course is to be found in the referenced copending application.

Referring again now to FIG. 1, apparatus similar to that above described is illustrated in general form. Each of the student-trainee positions, such as 10 and 12, is equipped with a number of simulated controls, such as a steering wheel 22, an accelerator 24, a brake pedal 26, a transmission shift lever 28, etc., as well as a number of simulated indicator devices such as a speedometer 30, a fuel gauge 32, a temperature gauge 34, etc. Operation of the simulated controls by the student results in various simulated indicators responding thereto, as a result of the above-mentioned simple RC analog computer associated with each student's location. By way of example, depression of the simulated acceleration pedal is effective to generate a voltage which, when applied to the simulated speedometer, results in a higher rate of speed being indicated. Conversely, depression of the simulated brake pedal is effective to decrease the magnitude of the generated voltage to thereby decrease the rate of speed being indicated by the simulated speedometer. Further, the operation of each control may be sensed, by any convenient method such as potentiometers, stepping switches, and the like, and an electrical signal representative of such operation may be conveyed to instructor's station 20. Additionally, the binary information encoded on the film sound track is also conveyed to the printing recorder included in the instructor's station, wherein it is decoded and made effective thereafter to identify the specific test problem displayed to the students, and this information is recorded with a symbol which identifies the car, or cars, at which the simulated control is not properly positioned, as stated above.

Figure 7:
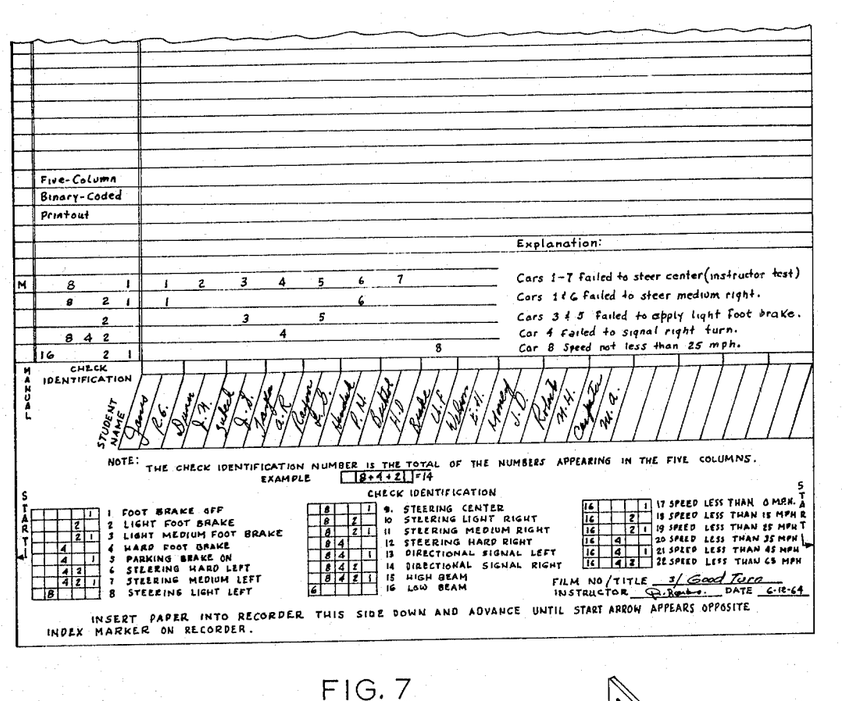
FIG. 7 is an illustration of a sample error print-out, or score sheet.

Continuing now with FIG. 1, station 20, in addition to including movie projector 18, also contains an auxiliary slide projector 40, which is selectively controlled by the instructor through one or more control devices indicated generally at 42, which may be switches or the like, operative to superimpose stationary scenes upon screen 16 in conjunction with the moving scenes provided by projector 18. As will be understood as the description proceeds, the operation of a control device 42 to activate slide projector 40 is also effective to generate the equivalent of a 5-bit digital code signal analogous to those encoded on the film within projector 18. Further, a separate and independent group of switches is provided among the control devices 42 to allow the instructor to separately select any particular problem test, and indications are obtained and recorded of the students' reactions to these manually inserted tests. It is important to note, however, that the sequence of tests encoded upon the film is always given priority, and during a monitoring, indicating, and/or recording operation determined by the film sequence, the positioning of the manually operated switches has no effect on detecting the student's operation of a selected control. Also located at central station 20 are a multichannel recorder 44 having only a *single* channel for each student location, and a bank of indicator lights 46, with only a single light assigned to each of the student locations. Not only is incorrect control operation indicated and recorded, but also readily identifiable check codes are simultaneously indicated and recorded, as illustrated in FIG. 7, by way of example, by printing the student location number corresponding to the location at which the control was erroneously operated, together with a check identification number associated with the test problem presented to the student. As shown in the sample error printout record illustrated in FIG. 7, a total of 22 separate tests are indicated by a 5-bit binary code, it being understood that a maximum of 32 separate tests could be identified by the selected 5-bit binary code, other and different code combinations being substituted as desired. Additionally, although a pre-printed form is employed for recording the specific errors committed by each student, the recording of student errors would be just as meaningful and simple to read if a plain unprinted form were substituted. Further, the bank of indicator lights 46 is subdivided in the same manner as the recorder, i.e., a series of 12 lights corresponds to each of the 12 cars, installed in this specific embodiment of the invention, together with a further series of 5 lights which corresponds to the binary coding of the student action control points. This bank of 17 lights duplicates the recorder printout, providing the instructor with a dynamic student error indication. If a student error persists, the light indication remains "up" until the introduction of the next checkpoint, thereby providing a means of evaluating student response time, attention, and learning. Finally, it is also important to not that when an instructor-initiated test problem is presented to the student-trainees, this is also recorded on the printed record, and, further, is indicated by the printing of the character M adjacent to the check identification code, as also shown in FIG. 7. As also shown in FIG. 1, the necessary interconnecting cables, such as 48 and 50, are provided to couple signals between central station 20 and each student location, as well as the necessary power required for proper operation of the simulated automobile.

Figure 2:
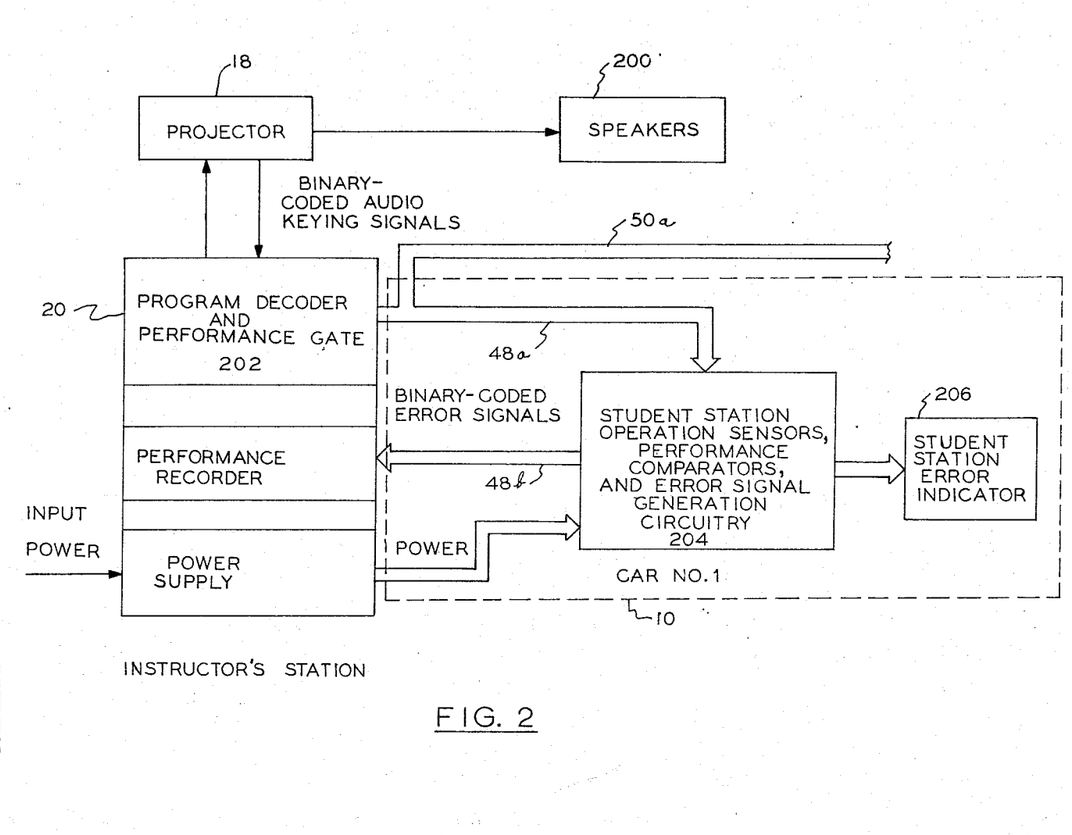
FIG. 2 is a simplified block diagram of an embodiment of the invention.

Referring now to FIG. 2, there is indicated in block diagram form, the electrical circuitry employed in monitoring, indicating, and recording the student-trainee's reactions to the realistic problem displayed upon screen 16. As there shown, projector 18, in addition to displaying the sequence of scenes onto screen 16, also operates to deliver any audio sounds, such as those created by trains, traffic, displayed automobiles, and the like, recorded on the film sound track, to a number of speakers 200, in order to provide the proper audio setting for the trainees, as well as directing the binary coded audio keying signals to a performance decoder and performance gate generator unit 202 located at the instructor's station 20. For each unique digital coded audio keying signal, a particular one of the parallel output lines from decoder 202 is energized in order to select the control at each location, the operation of which is to be indicated and recorded. The actual matrix is hereinafter more completely described. Upon the energization of the particular one of the output lines, in response to either information encoded upon the film, or, alternatively, under control of one or more of the switches 42, the students' reactions to the selected test problem are monitored by an operation sensor and error signal generation circuitry unit 204 located in each simulated vehicle, each of which such units provides a group of binary coded error signals to the central station for indication and recording of the errors, as well as providing an error signal to a student station error indicator 206. Student error identification panel 206 provides instantaneous feedback to the student upon his committing a driving error, so that he can take corrective action. This feedback identifies errors being made in braking, steering, turn signals, headlight control, speed, and the like. The indication of errors is presented by indicator lights mounted in a small reproduction on panel 206 of the driving controls (see FIG. 1) and is mounted in front of the student in a position to be easily seen, but where it does not interfere with forward viewing of the visual presentation.

Figure 3:
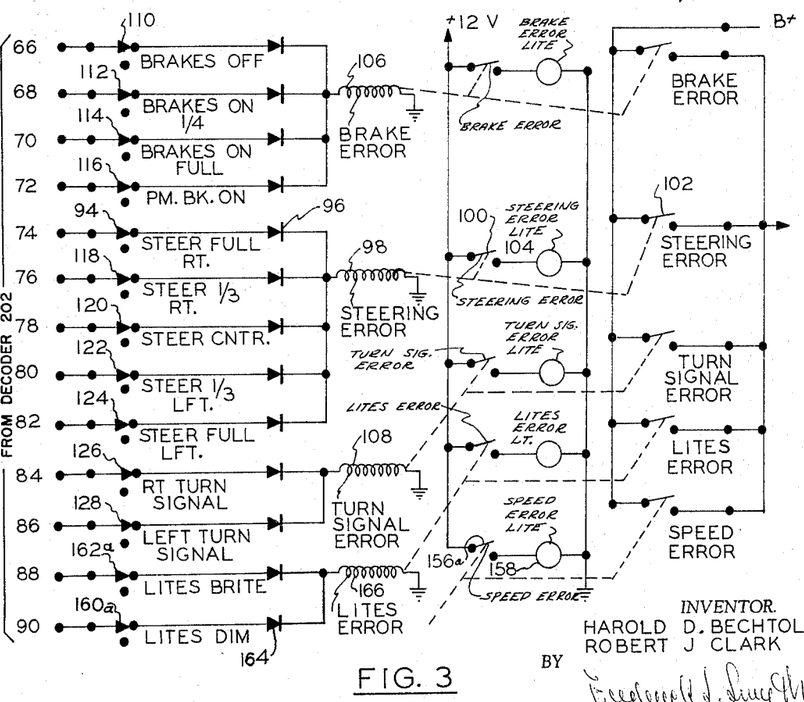
FIG. 3 is an electrical schematic diagram of a portion of the operation sensor illustrated in FIG. 2.

FIG. 3 illustrates a portion of the sensor and error signal generation circuitry 204. As there shown, 13 input lines 66 through 90 are coupled to the individual parallel output lines of program decoder 202. When a given binary number is encoded on the film and decoded by program decoder 202, an electrical signal representative of such number is fed to all of the student locations along a particular one of the parallel output lines. For example, the binary number five may be encoded on the film with a scene or sequence which demands that the student steer full to the right. Upon decoding this binary number, decoder and gate generator 202 energizes its output conductor No. 5, thereby applying a voltage to line 74. If the student is steering full to the right at the time line 74 is energized, a switch 94 is open and no signal is fed through an isolation diode 96 to energize a steering error relay 98. If, however, the student is not steering full to the right at the time line 74 is energized, switch 94 will be closed, and an error signal will be applied through diode 96, thereby energizing relay 98. Energization of the armature of relay 98 is effective to transfer the associated normally open contacts 100 and 102, the first of which operates to illuminate a local steering error relay light 104 positioned in student station error indicator 206, and the second of which imparts an error signal to instructor's station 20. Switch 94 is operated by the trainer steering wheel and is closed for all steering positions except full right. It should be noted that, in the preferred embodiment of the invention now being described, only *errors* are sensed, indicated and recorded, rather than the control positions and conditions themselves, which, of course, results in no output indication if the student performs perfectly. Additional output conductors coupled to the program decoder are also illustrated in FIG. 3, connected through respective switches, which may be switch or relay operated, to energize either a braking error relay 106, steering error relay 98, turn signal error relay 108, or a light error relay 166. It should be understood that switches 110, 112, and 114 are operated by the brake pedal, and switch 116 is responsive to the position of the hand brake. Switches 94 and 118 through 124 are operated by the simulated steering wheel, and switches 126 and 128 are operated by the turn signal control.

Figure 4:
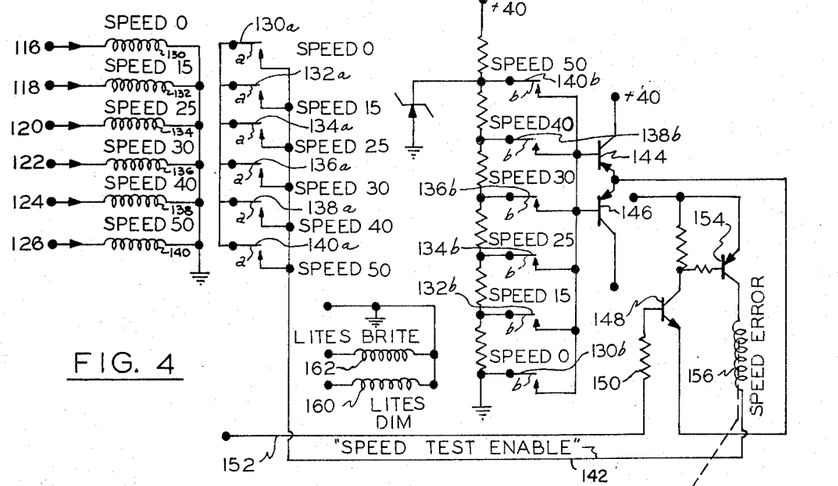
FIG. 4 is an electrical schematic diagram of a further portion of the operation-sensing circuitry illustrated in FIG. 2.

Since monitoring, indicating, and/or recording the students' simulated speed is relatively important, the apparatus of the invention additionally incorporates circuitry for detecting speed errors. By encoding a selected binary number on the film, a speed test output conductor of program decoder 202 will be energized, thereby energizing a respective relay of the group 130 through 140 connected to terminals 116 through 126 as shown in FIG. 4. This energization of one of the relays 130 through 140 is effective to activate a "speed test enable" circuit by grounding line 142, by closing one of contacts 130a through 140a. Closure of one of the *b* contacts of relays 130 to 140 connects a predetermined voltage from a voltage divider via a complimentary pair of transistor emitter-followers 144 and 146 to the emitter of a transistor 148, the base of which is connected via a resistor 150 and a line 152 to the voltage simulating the car velocity. When the simulated automobile velocity does not exceed the instantaneous maximum permissible velocity, the voltage applied to the emitter of transistor 148 exceeds the voltage applied to the base thereof, thereby cutting off transistors 148 and 154. However, when the student is driving at a simulated velocity greater than that permitted, transistors 148 and 154 conduct, and a speed error relay 156 is energized, illuminating a speed error indicating light 158, located on student station error indicator 206, through the now transferred normally open contact 156a as shown in FIG. 3.

Figure 5:
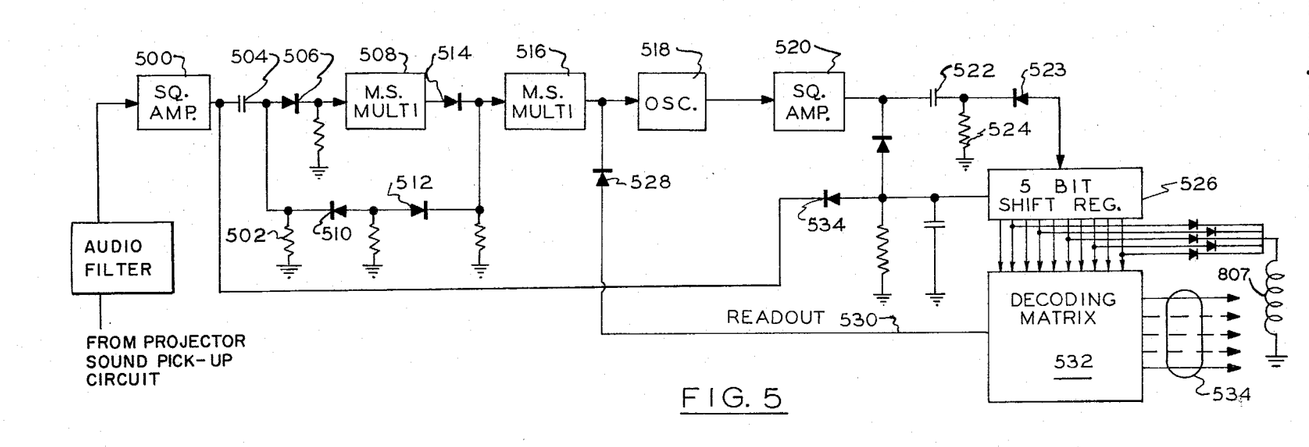
FIG. 5 is a block diagram of the program decoder illustrated in FIG. 2.
Figure 6:
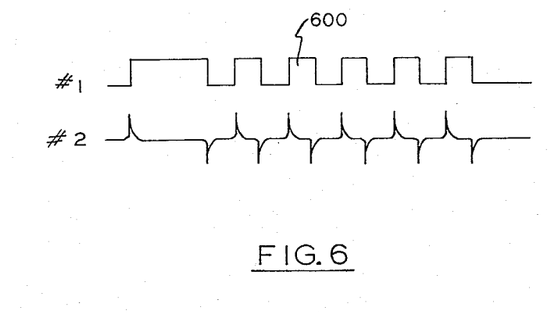
FIG. 6 is a waveform diagram useful in understanding the operation of the apparatus of FIG. 5.

As also shown in FIG. 4, the simulated foot-operated headlight dimmer switch is connected to the power source through a headlight switch and is effective to energize either a "dim" or "bright" relay 160 and 162, respectively. If binary number 13 is coded on the motion picture film, or manually selected by the instructor, line 90 is energized, and an electrical signal is applied via an isolation diode 164 and contact 160a of relay 160 (FIG. 4) to energize a light error relay 166 unless the student has properly dimmed the headlights by his operation of the headlight dimmer switch. Relay 162 is arranged analogously to indicate intervals when the student may erroneously neglect to switch the simulated headlights to bright. It should further be noted that the recorder contacts of all the error relays may be connected in common as shown in FIG. 3, to convey all the error indications from the operator's position to the central station, but it generally is preferred to convey the error indications separately to the central station for purposes of error indications, which will be better understood as the description proceeds. The projector which provides the visual display to be seen by the students is provided with conventional sound pickup means, such as a photocell which provides electrical signals in accordance with the character of pulses recorded on the "sound track" of the film. In the invention, pulses are encoded on the sound track to provide five-digit serial binary numbers. Each series of encoded pulses is preceded by a synchronizing pulse which signals the advent of a serial train of pulses. By providing "pulses" and "no pulses" during the five-digit times of the signal period, a serial binary number will be seen to result. FIG. 6 shows as waveform #1 a synchronizing pulse followed by five signal pulses, indicating the binary number "11111" or 32 in decimal form. If no pulse were recorded in the position of pulse 600 in FIG. 6 for example, the binary number would instead be "10111" or 24 in decimal form. The serial binary numbers read from the film sound track are converted to parallel binary form by the apparatus shown in FIG. 5, and then decoded to energize selectively one of a group of output conductors. For example, if the binary number "six" is encoded at a given place on the film, conductor number 6 of the output conductor group will be energized as the place on the film passes through the projector.

The photocell output from the projector sound detector is applied through a band pass filter, centered at 5 kc. for example, and then to a squaring amplifier 500, which reshapes the pulses to a uniform height. The pulses are differentiated by means of resistor 502 and capacitor 504 to provide waveform #2 as shown in FIG. 6. The positive-going spikes are applied via diode 506 to a 3 millisecond, by way of example, monostable multivibrator 508 and the negative-going spikes are applied by means of diode 510 to an AND gate comprising diodes 512 and 514. The first incoming positive-going pulse edge sets multivibrator 508, providing a positive voltage therefrom for 3 milliseconds. If a negative-going spike occurs before multivibrator 508 resets, diode 514 will be cut off, but diode 512 will be conducting, preventing application of a signal to a 20 millisecond monostable multivibrator 516. Thus the circuit will not trigger multivibrator 516 until a pulse at least 3 milliseconds in duration (or longer) is received. When the synchronizing pulse eventually arrives, however, multivibrator 508 will be set by its leading edge and then will automatically reset itself before the end of the synchronizing pulse, so that occurrence of the synchronizing pulse trailing edge will cut off both diodes 510 and 514 and provide a negative pulse to multivibrator 516. Multivibrator 516 provides a 20 millisecond output pulse whenever triggered by the AND gate output signal. The 20 millisecond output pulse gates on a 250 c.p.s. oscillator 518, which will be seen to produce five cycles of output signal during the 20 millisecond period. The five cycles of oscillator output are squared by amplifier 520, differentiated by capacitor 522 and resistor 524, and the negative spikes therefrom applied to shift a conventional 5-bit shift register 526. The negative-going trailing edge of the 20 millisecond output signal from multivibrator 516 is connected via diode 528 to operate the readout line 530 of a decoding matrix 532 to be further explained below. It will be seen that every time a synchronizing pulse is applied, shift register 526 will be shifted through all five of its stages. The input signal from squaring amplifier 500 is also applied as shown via diode 534 to the input line of shift register 526. Upon completion of the 20 millisecond sampling period, it will be seen that the last five input pulses to have been applied from amplifier 500 will be stored in shift register 526, and the occurrence of the readout pulse on line 530 at the end of the sampling period now will be seen to apply a parallel five-digit binary-coded number to decoding matrix 532. Decoding matrix 532 receives the five digit binary signal and energizes a selected output conductor depending upon the binary number read from shift register 526. Alternatively, matrix 532 may be coupled to a chain of five cascaded bistable devices, such as flip-flops or the like, in order to energize the selected one of output lines 534 indicated in FIG. 5. It should also be understood that the energized line is connected to each one of the student-trainee positions (note cables 48 and 50 illustrated in FIG. 1 for example) in order to check any erroneous operation at *all* of the student positions of the selected control being monitored. In the specific embodiment now being described, 10, 19, 22 or up to 31 such control operations may be monitored, binary code 00000 being reserved to terminate each film test, and thereby render the manual test switches 42 operative during the time intervals between each film test sequence, as hereinafter more particularly described. Additionally, although the description up to now has indicated that the selected test line is energized by matrix 532 with each of the error relays having one terminal normally connected to ground, the invention is just as meaningful with the error relays normally connected to a source of potential, matrix 532 then being selectively operable to ground the specific test line selected in order to monitor a specific control operation in all of the student's positions, and hereinafter, unless otherwise indicated, this modified embodiment will be described, it being understood that either embodiment may be employed as desired, without departing from the spirit of the invention.

It should now be understood that the apparatus provided by the present invention operates to supply immediate error feedback to each student by means of the several indicator lights located on student error identification panel 206, and it has been found that the five error lights, per station, as employed in the present embodiments are sufficient to rapidly and efficiently train the students in the proper operation of the simulated automobile, although a greater or lesser number of error lights may be installed as desired. Further, student's errors are monitored, indicated, and recorded at central station 20 in a simple yet extremely flexible manner.

Figure 8A:
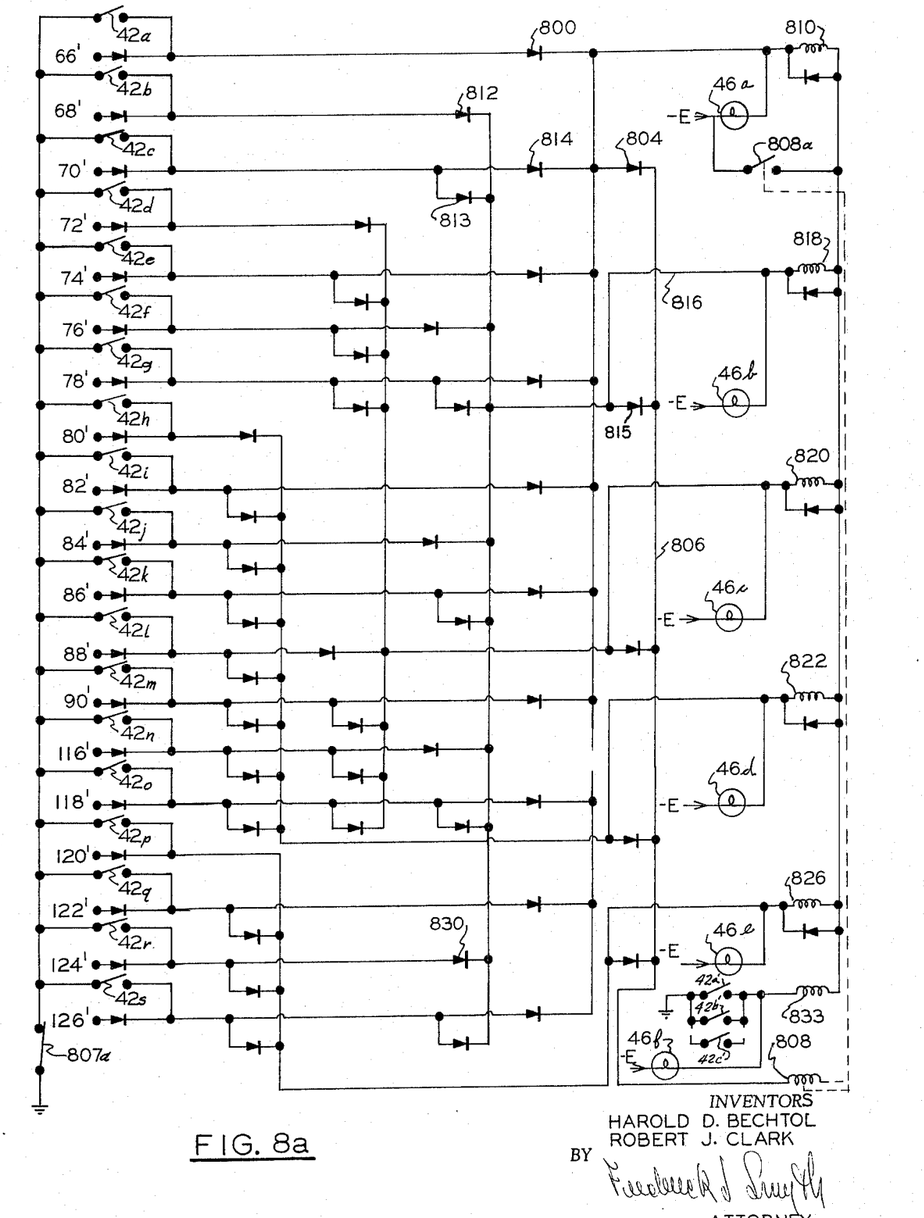
FIGS. 8 and 8b, together, are an electrical schematic diagram of portions of the instructor's station illustrated in FIG. 2.
Figure 8B:
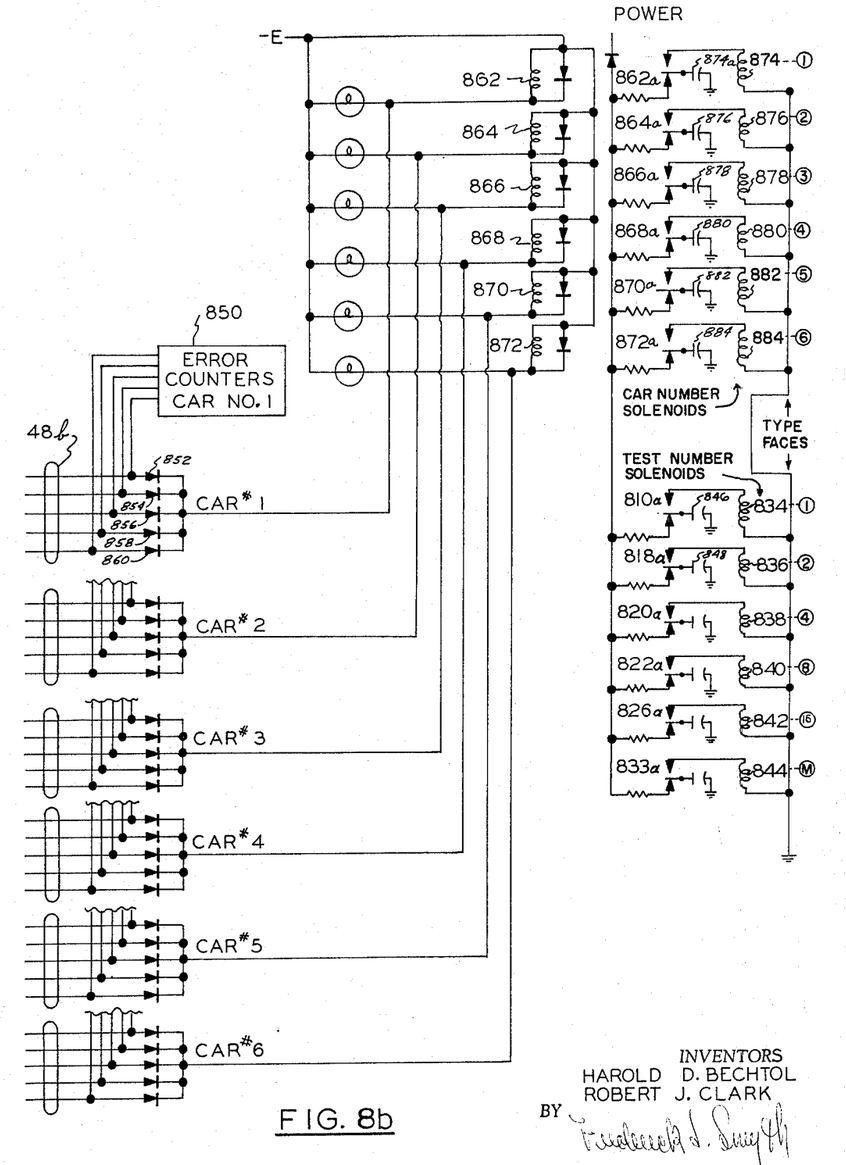

Referring again now to the drawings, FIGS. 8a and 8b together illustrate, in simplified form, electrical schematic diagrams of portions of the indicating and recording system forming a portion of instructor's station 20. Turning first now to FIG. 8a, there is illustrated an electrical circuit operable to both indicate and record the binary number by which each test problem is positively and individually identified. As stated above, each test problem is originated either by digital data encoded on the motion picture film threaded through projector 18, or, alternatively, by a number of switches 42a through 42s for example, postioned on console 20, there being one switch for each test problem. For reasons of clarity, the various input terminals shown on the leftmost porton of FIG. 8a have been assigned the same reference numerals as those assigned to the various input terminals shown in FIGS. 3 and 4, in order to emphasize that both sets of terminals, whether located in a student's station (FIGS. 3 and 4) or in console 20 (FIG. 8a), are selectively energized by cable 534 coupled to decoding matrix 532, the terminals of FIG. 8a being distinguished through the use of primes, affixed thereto. Note should be made of the fact that each one of input terminals of the groups 66′ through 90′ and 116′ through 126′ is paralleled by a respective one of manual test switches 42a through 42s, each of which is effective upon closure, in the absence of an automatic test encoded on the film, to initiate an error check cycle. As stated thereinbefore, the automatic test sequence is assigned priority over any and all of the manual tests. For this reason normally closed contact 807a of relay 807 is inserted in series between ground and all of the manual test switches 42a–42s. It thus will be seen that the transfer of contact 807a renders all of switches 42a–42s inoperative. Referring again now to FIG. 5, relay 807 is energized whenever a binary one is stored in any bit position within shift register 526. If and only if a proper digital signal is delivered to amplifier 500 will there be a binary one stored in register 526. Therefore, an automatic test sequence is effective to energize relay 807, the then transferred contact 807a of which inhibits manual test switches 42a through 42s. This priority arrangement affords the instructor extreme flexibility in training the students. By way of example, the film may sequentially provide a series of tests requiring the students to properly steer, brake, employ the correct turn signal, etc. Meanwhile, during this sequence the instructor may require the students to limit the simulated speed to 30 m.p.h. Thus, the instructor merely closes switch 42r, and thereafter, during the entire film sequence, should any of the students exceed a speed of 30 m.ph. in the intervals between the specific automatic tests originated by the film, this speed error will be immediately recorded.

Returning again now to FIG. 8a, whenever the apparatus is testing and recording whether or not the foot brake is in the "off" position, either matrix 532 operates automatically in response to data coded on the film to ground terminal 66′ or else switch 42a has been closed manually by the instructor. In either event, the effective grounding of terminal 66′ causes current flow through serially connected diodes 800 and 804, along line 806, and through the armature of relay 808. This energization of relay 808 transfers the normally open contact 808a to provide a potential to each of print relays 810, 818, 820, 822, 826, and 833. It will be apparent that the grounding of any of the input terminals is similarly effective to pick up relay 808 and thereby allow the print relays to be operated. The grounding of terminal 66′ is further effective to energize the armature of print relay 810, since normally open contact 808a is now transferred, as well as illuminating indicator light 46a. Referring now to FIG. 8b, contact 810a, which normally provides a charging path for a capacitor 846, operates to couple charged capacitor 846 in series with solenoid 834. Associated with solenoid 834 is a magnetic printing slug, encoded with the numeral one, which upon discharge of capacitor 846 through solenoid 834, is forced into contact with the error printout record (see FIG. 7), intermediate of which is positioned a conventional typewriter ribbon or the like. In this manner, only solenoid 834 operates to print the numeral one, to identify that test number 1 is being conducted. In similar fashion, the grounding of input terminal 68′ operates to pick relay 808 through diodes 812 and 815 and line 806, as well as picking print relay 818 along line 816 and illuminating indicator lamp 46b. Again the energization of relay 818 transfers contact 818a thereby discharging capacitor 848 through solenoid 836. Also associated with solenoid 836 is another magnetic printing slug encoded with the numeral two which, by itself, serves to identify that test number 2 is selected. Continuing, print relay 820 when picked energizes solenoid 838 having an associated printing slug encoded with the numeral four, print relay 822 when picked energizes solenoid 840 having an associated printing slug encoded with the numeral eight, and print relay 826 when picked energizes solenoid 842 having an associated printing slug encoded with the numeral sixteen. It thus will be seen, that the diode network shown in FIG. 8a is effective to positively indicate and record, in binary notation, which one of the tests has been, either automatically or manually, selected. By way of example, should test 18 be monitored, either by the automatic grounding of input terminal 124' by matrix 532 or by manual closure of switch 42r, print relay 826 is energized through diode 829, and, additionally, by means of diode 830, print relay 818 is simultaneously energized. Thus, the associated printing solenoids associated therewith are effective to record test "16 . . . 2 . . .," or more simply test 18. Note should also be made of the fact that indicator lights 46b and 46d are also illuminated to identify, in binary code, that test 18 has been selected. It should now be understood that the circuit of FIG. 8a is effective to both indicate instantaneously and to permanently record the selected test in the manner illustrated in FIG. 7.

Print relay 833 operates in a similar fashion, contact 833a thereof being selectively operable to pulse an associated solenoid 844 (see FIG. 8b) in order to print the letter M simultaneously with the binary encoded test number as shown in FIG. 7. The armature of print relay 833 is energized by a further contact on each of manual test switches 42a through 42s, the further contacts of only three of switches 42a–42s being shown in FIG. 8a at 42a', 42b', and 42s'. Further, the energization of print relay 833 is indicated by associated indicator lamp 46f, in order that the instructor have a visual display not only of the particular control operation being monitored, but also an indication of whether or not the particular control operation is being monitored under automatic or manual control. It should be strongly emphasized that the indication and recording of the specific test being monitored is an important advance in the art, since heretobefore in the training devices of the prior art, it has been necessary to record the operation of groups of control positions, the instructor writing the specific one of the groups being monitored upon the printed record, and, of course, any indicator lights associated therewith have been meaningless, unless the instructor had prior knowledge as to which particular one of each group of control positions was to be monitored.

Referring now to FIG. 8b, there is illustrated, partly in block diagram form, the circuitry for both indicating and recording student errors at instructor's console 20. As there shown, a five-conductor cable from each student station is provided, to indicate and record brake, steering, turn signal, lights, and/or speed errors performed by the individual students, only six such cables being pictured in FIG. 8b, it being understood that more or less cables associated with student's stations may be employed as desired. Initially, each class of errors are separately conveyed to an error counter, such as counter 850, which is operable to totalize the errors made by one of the students during a sequence of tests. It should now be understood that the totalization of errors by class, brake, speed, steering, etc. requires the five-conductor cable. Should counter 850 be ommitted from a specific installation, only a single conductor cable, of course, is required, since, as explained above, each specific test is both positively indicated and recorded in binary code. As further shown in FIG. 8b a diode OR circuit, exemplified by diodes 852 through 860 associated with car No. 1, for example, operates to couple any student error made by the student in car No. 1 and present on one of the conductors of cable 48b to car No. 1 print relay 862, as well as to an associated indicator light. Car No. 1 error print relay operates in essentially the same manner as the binary print relays hereinbefore described, that is, the transfer of contact 862a operates to discharge capacitor 874a through solenoid 874. Again, associated with solenoid 874 is a magnetic printing slug encoded with the numeral one, so that each and every one of the errors committed by the student in car No. 1 is identified and recorded, and, further, is identified and recorded in parallel with the specific test problem as illustrated in detail in FIG. 7. It should now be understood that the errors occurring in all of the several other student's positions are similarly identified by an assigned indicator lamp and one of print relays 864, 866, 868, 870, 872, etc. Additionally, at the end of the time interval occupied by each of the automatic tests, binary number 00000 is encoded on the film in order to clear register 526, thereby deenergizing relay 807 and returning control of the test problems to manual switches 42. It should also be noted that relay 807 is preferably a slow-acting relay in order to permit the advance of the record paper prior to monitoring the manual test selected.

In summary, the student scoring system operates in accordance with a binary coded keying program optically stored on the sound track of each teaching film. A manual error-checking panel permits the instructor to insert manual checks as well. The apparatus, as disclosed, consists of all of the necessary decoding electronics, comparison circuitry, error-generating circuitry, and recording and display equipment.

In general, a coded pulse train is recorded on the sound track of the teaching film at each point on the film where a patricular student action is required. This coded signal serves as a check point which keys the scoring system to monitor, indicate, and record if the student responded in the required manner. The coded pulse train is picked up by a phototransistor, by way of example in projector 18 for conversion to electrical signals along with the conventional audio signals recorded thereon. The binary coding is filtered from the composite signal and converted to its decimal equivalent. The decoding circuitry also accepts binary coding introduced by the instructor through the operation of switches 42 on the manual error checking panel located on console 20. The decimal equivalent of the binary-coded signals channels them into a selected one of the individual test lines coupled to each student's station, each line corresponding to one of the different scorable student actions. Each line carries performance time gates that activate the comparator circuitry in the student station. If the student-generated response signals do not occur within the prescribed time, an error relay is energized, which, in turn, supplies signals to light the appropriate light on student error panel 206. The error relays are also set up in binary fashion, so that only five relays are required to describe up to 31 error conditions. The outputs of these five relays are also used to generate recorder signals and operate error indicator lights on the instructor's console.

The teaching films, as now should clearly be understood, contain automatic (pre-recorded) student action points. Switches 42, located at the instructor's console provide manual student-action point programming. Thus, two methods of programming student action points are available. The pre-recorded data on the teaching film sound track consists of a 5000-cps. signal which is pulse-code-modulated, for example. Each pulse train comprises a possible 5-pulse binary representation (32 count capacity with code 00000 reserved for clearing shift register 526 at the termination of each pre-recorded test check), where each pulse is 2-milliseconds wide with an equal repetition rate. Each group of 5 pulses is preceded by a 6-millisecond pulse which conditions the decoding electronics for the forthcoming data. The total pulse train for one student action point requires, therefore, only 26-milliseconds.

Initially, all audio information, excluding the coded data, is recorded on magnetic tape. The tape is thereafter edited with the picture information to determine the placement and type of student action required, and, through the use of a relatively simple code generator, the desired pulse train is superimposed on the audio information. The composite audio data is then added to the 16mm resulting film at the same time that the film is being reduced from the original 35mm film.

Manual student action programming is facilitated by a panel mounted on the instructor's console having one switch for each of the tests as described above. The instructor may then select one or more of the available student action points as desired, it being understood that an automatic pre-recorded film action point operates to inhibit the action of all of the manual test switches. Thus, the manually inserted checkpoints are acted upon by the decoding electronics (see FIG. 8a) during the "OFF" time of the automatic programming. The automatic programming, of course, retains priority, overriding any manually inserted test during the automatic programming period.

The error signals generated in each of the simulated automobiles are a result of a comparison between desired responses (the programmed student action checks as shown in FIGS. 3 and 4) and the student's actual responses. The 5-kc. pulse train, that is, the desired response, is separated from the normal sound track audio signal by an audio rejection filter, demodulated to produce a pure binary pulse train, and applied to a 5-stage shift register or counter 526. The binary output of stage 526 is in turn converted to decimal form by means of matrix 532. One, and only one, of output lines 534 coupled thereto produces an energized or grounded output which is directly applied to the computing circuits of the simulated automotive systems. On the opposite end of these computing circuits is an error relay tree which is energized if the check condition called for is not satisfied by the student's response. The error relay tree is composed of five relays, by way of example, which produce a binary-coded output corresponding to the particular error committed. One set of contacts on the error-relays controls the appropriate indicator light on student's error identification panel 206; the remaining set of contacts controls a corresponding indicator light 46 on instructor's console 20, as well as the performance recorder printout for a permanent scoring record.

This permanent record is available to the instructor for each unsatisfactory student reaction. This information is generated by a simple, yet highly reliable, performance recorder which includes only four main parts—the paper drive, the printing mechanism, the instant readout panel, and a cover plate. The paper drive is accomplished by a geared synchronous motor-driven rubber platen and a series of pressure idlers mechanically displaceable by a lever to provide for proper paper insertion. The platen is advanced preceding each printout. This design preferred since it avoids the need for specially prepared, edge-perforated paper for sprocket-type drives. A major advantage of the pressure drive system is the independence of the paper from the printing mechanism operation. Although the performance recorder has been described as using pre-printed chart paper, the recording of student errors is just as meaningful and simple to read even if a plain unprinted paper were substituted, for the reason that each test check is encoded together with the number of the car in which the error occurred as shown in FIG. 7.

The printing mechanism consists of an assembly of 18 solenoids, in an installation including a group of 12 simulated cars, arranged in a horizontal row above the platen. The appropriate type face is fastened to the plunger of each solenoid, allowing all symbols to be printed simultaneously. A standard typewriter ribbon, positioned between the type and the platen, is mechanically driven in either direction. An automatic ribbon reversing mechanism is also incorporated, insuring constant legible printouts and avoiding the possibility of losing a training session by neglecting to reverse the ribbon direction. Removal of the cover plate allows direct access to the ribbon spools when it is necessary to replace the ribbon. Further, the instant readout panel is part of the basic recorder structure, and consists of a series of 12 lights 46, corresponding to the 12 cars in the trainer, and an additional series of 5 lights corresponding to the binary coding of the student action tests or checkpoints. The individual lights indicating individual cars are shown in FIG. 8b, and the five lights identifying the type of test are shown in FIG. 8a. This series of 17 lights duplicates the recorder printout, providing the instructure with a dynamic student error identification. Also another indicator light 46 may be added, if desired, in order to identify a manual inserted test, as shown at 46f in FIG. 8a. If the student error should persist, the light indication remains up until the introduction of the next checkpoint or until the termination of the present checkpoint, thereby providing a means of evaluating student response time, attention, and learning, all as above described.

It will thus be seen that the objects set forth above, among those made apparent from the preceding description, are efficiently attained, and since certain changes may be made in the above constructions without departing from the scope of the invention, it is intended that all matter contained or shown in the accompanying drawings shall be interpreted as illustrative and not in a limiting sense.

The embodiments of the invention in which an exclusive property or privilege is claimed are defined as follows:

1. Automobile driver training apparatus, comprising, in combination:

a plurality of simulated automobile driver stations for simultaneously training a plurality of students, each of said stations including a respective plurality of simulated controls operable by a student; motion picture projection means for providing a sequence of scenes capable of being viewed simultaneously from each of said stations; means for automatically generating a sequence of different electrical signals in timed relation to the provision of said sequence of scenes, each of said electrical signals being coded to correspond to a desired operation of one or more of said simulated controls; a group of error-indicating means individual to each of said stations and visible by the student at each respective station, each of the error-indicating means in each group being associated with a respective class of error, each said class of error being associated with mis-operation of one or a selected group of said controls; comparison means associated with each station, responsive to the operation of the controls at said station and responsive to the one of the electrical signals generated at a given time for comparing the operation of a selected one or a selected group of said controls with the desired operation associated with said coded electrical signal and for providing error signals upon mis-operation of said one or said selected group of controls;

first circuit means associated with each station for applying error signals generated at said station selectively to the error-indicating means associated with said station, to indicate the class of error being committed to the student at said station;

and recorder means including a first plurality of marking devices and a second marking means, each of said marking devices being connected to be operated upon the occurrence of each said error signal at a respective station, and said second marking means being connected to be operated by said coded electrical signals to record indicia indicative of the nature of the desired operation of said coded electrical signals.

2. Apparatus in accordance with claim 1 in which said second marking means comprises a second plurality of marking devices arranged to identify said desired operation in terms of a multi-digit coded notation by actuation or non-actuation of respective of said marking devices.

3. Apparatus according to claim 1 in which said recorder means includes motive means for translating a record sheet relative to platen means, and in which said marking devices each includes an electromagnet solenoid operable upon actuation to urge a type face toward said platen means.

4. Apparatus according to claim 1 in which said recorder means includes motive means for translating a record sheet in a first direction relative to said plurality of marking devices and said second marking means, and in which said marking devices and said second marking means are disposed in a row extending in a second direction perpendicular to said first direction.

5. Apparatus according to claim 1 in which said recorder means is located at an instructor station, and in which said apparatus includes a plurality of lights located at said instructor station and connected to be illuminated upon occurrence of said error signals.

6. Apparatus according to claim 1 having further means including switch means controllable by an instructor for providing during said sequence at times determined by the instructor further electrical signals corresponding to said different electrical signals, each of said further electrical signals being coded to correspond to a desired operation of one or more of said simulated controls and each of said further electrical signals being applied to said comparison means.

7. Apparatus according to claim 6 having means responsive to provision of one of the two mentioned types of electrical signals for inhibiting simultaneous provision of the other mentioned type of electrical signals.

8. Apparatus according to claim 6 in which said recorder includes third marking means connected to be actuated upon provision of one of said further electrical signals.

9. Apparatus according to claim 6 having means responsive to provision of any of said automatically-generated different electrical signals for inhibiting simultaneous provision of said instructor-controllable further electrical signals.

10. Motor vehicle driver training apparatus, comprising, in combination:

a simulated motor vehicle driver station including a plurality of simulated controls operable by a student; motion picture projection means for providing a sequence of scenes visible from said station; means for generating a sequence of coded electrical signals in timed relation to the provision of said sequence of scenes; means associated with said station responsive to the operation of said station and responsive to the one of said electrical signals being generated at a given time for providing error signals upon mis-operation of one or more of said controls; and recorder means including a first marking means for recording the same predetermined mark upon the occurrence of successive error signals and a second marking means responsive to said coded electrical signals for making different successive marks which identify the respective types of said coded electrical signals.

11. Apparatus according to claim 10 having manually-operable means for inserting further coded electrical signals into said sequence and a further marking device actuated by operation of said manually-operable means.

References Cited by the Examiner
UNITED STATES PATENTS

| | | | |
|---|---|---|---|
| 2,870,548 | 1/1959 | Chedister | 35—11 |
| 3,015,169 | 1/1962 | Chedister et al. | 35—11 |
| 3,108,384 | 10/1963 | Jazbutis et al. | 35—11 |
| 3,186,110 | 6/1965 | Smyth | 35—11 |
| 3,193,946 | 7/1965 | Patuano | 35—11 |
| 3,205,592 | 9/1965 | Wood | 35—11 |

EUGENE R. CAPOZIO, *Primary Examiner.*

S. M. BENDER, *Assistant Examiner.*